Aug. 18, 1936.    H. A. GUTHRIE    2,051,039
SELF WATERING BATTERY
Filed Aug. 10, 1933    2 Sheets-Sheet 2
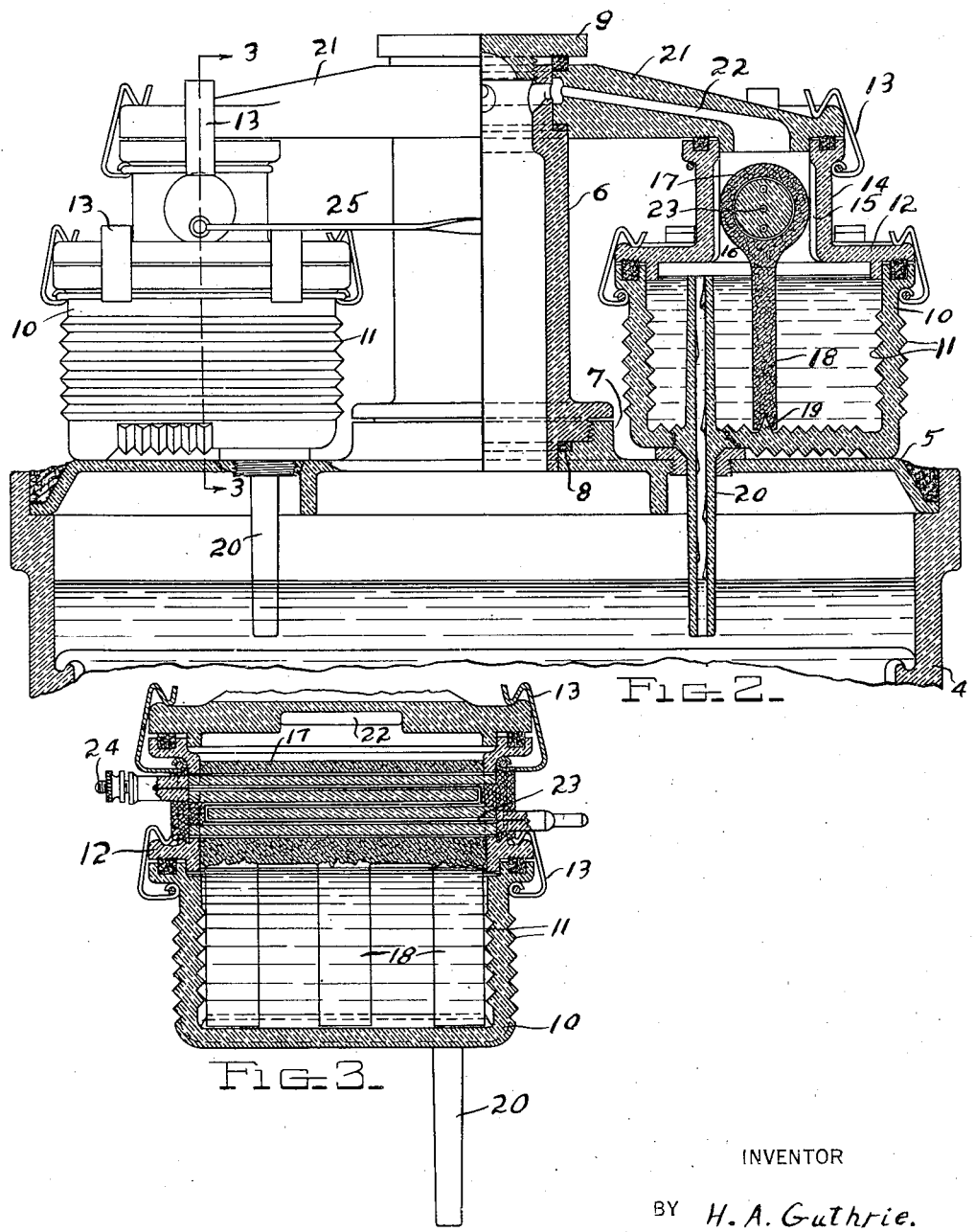
INVENTOR
BY H. A. Guthrie.
Harold Dodd
ATTORNEY Patented Aug. 18, 1936

2,051,039

UNITED STATES PATENT OFFICE 2,051,039

SELF-WATERING BATTERY

Harry A. Guthrie, United States Navy

Application August 10, 1933, Serial No. 684,553

11 Claims. (Cl. 136—179)

(Granted under the act of March 3, 1883, as amended April 30, 1928; 370 O. G. 757)

This invention relates to means for recombining into water the gases evolved by an electric storage cell during the charging thereof.

Among the objects of this invention are to make it unnecessary to add water to a storage cell while it is in service; to prevent explosions in submarines due to arcing in the gas vents that carry off the evolved gases and to eliminate the necessity of carrying water for the batteries, thus making available more space for other purposes.

With the above and other objects in view, the invention consists in the construction, combination and arrangement of parts as will be hereinafter more fully described.

There have been provided heretofore devices for causing the chemical combination of the gases evolved by storage cells but so far as I am aware they have all depended upon an element heated to a temperature sufficient to bring about that result which, under those conditions, is always effected with explosive violence. It is the purpose of my invention to cause the gases to recombine at a temperature below that at which explosions will occur and to that end I provide cooling means to dissipate the heat of the reaction and no highly heated element.

Reference is to be had to the accompanying drawings forming a part of this specification in which like reference characters indicate corresponding parts throughout the several views and in which:

Figure 2 is a side elevation thereof with parts in section on the line 2—2, Figure 1;

Figure 3 is a sectional view of one element of my invention on the line 3—3, Figure 2.

Figure 1:
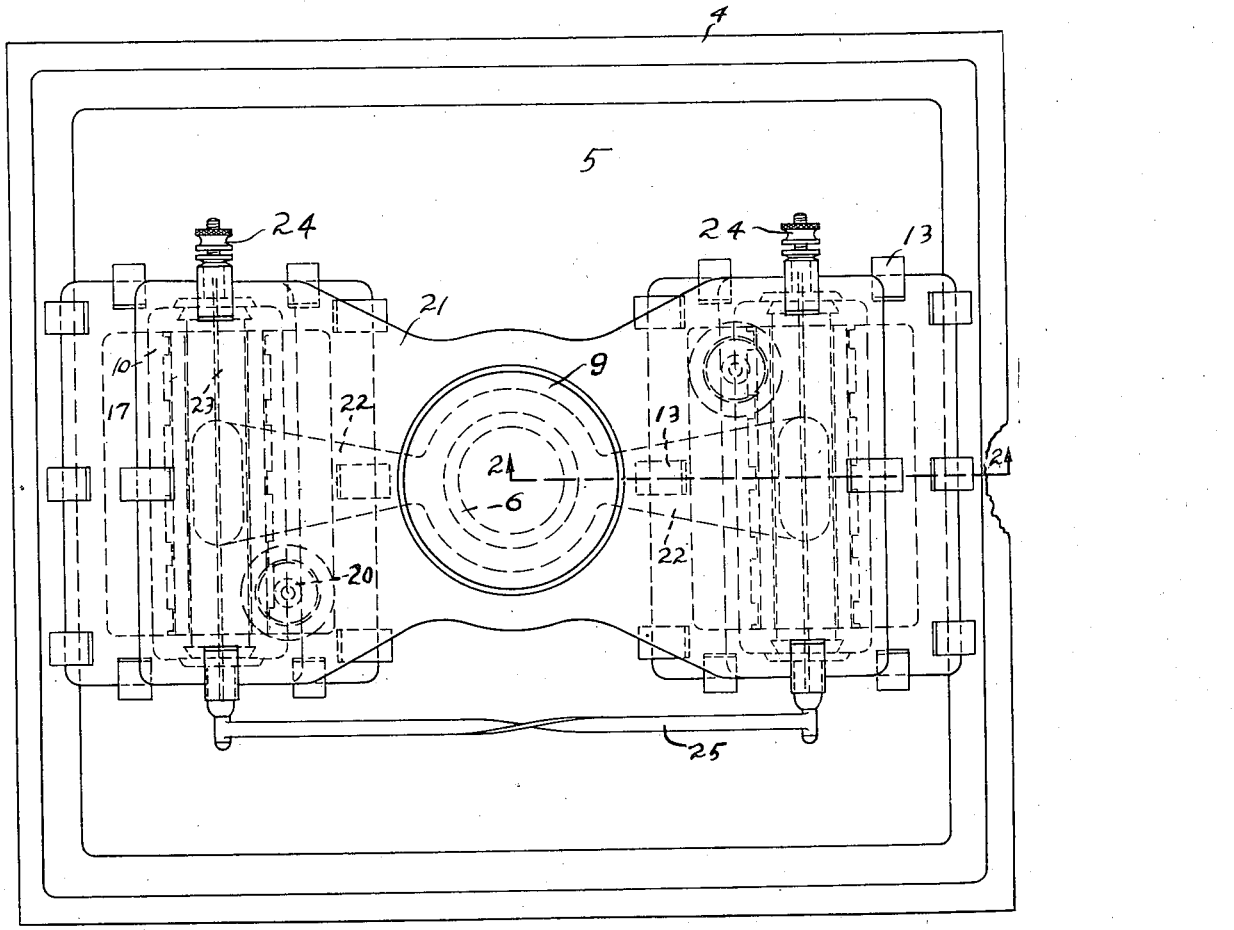
Figure 1 is a top plan view of a cell equipped with the present preferred embodiment of my invention.

The battery case 4 may be of any known construction and has sealed on it in the usual manner a cover 5 in which is a centrally disposed aperture to receive a cylindrical member 6 in threaded engagement with a flange 7 around the aperture, packing 8 being disposed between the member 6 and the cover in a manner to make a fluid tight joint. A cap 9 closes the upper end of the member 6 and ordinarily need not be removed during the service of the cell since it is not necessary to add water or electrolyte.

Seated upon cover 5 are a plurality of containers 10 for liquid, the number thereof being determined by the size of the cell and the volume of gases that it will be necessary to recombine into water. In the form of invention shown these containers 10 are preferably of glass known by the trade name of "Pyrex", and are internally and externally corrugated as indicated at 11 to provide large surfaces to carry off heat. A closure 12 is retained upon each container 10 by means of spring clips 13. Rising from each closure 12 is a neck 14 of considerable width having grooves 15 formed in its inner face to permit the passage of fluids through the neck when the catalytic supporting member 16 is positioned therein, as hereinafter described. This member, which may be of a suitable heat and acid resisting material, such as clay or alundum, comprises a body portion 17 having a transverse dimension substantially equal to the width of the opening in neck 14 and a plurality of legs 18 adapted to rest upon the bottom of container 10. There is preferably formed in the lower end of each leg a slot extending parallel to the length of the member 16 to receive a corrugation 19 which will prevent lateral displacement of the legs 18. The catalytic material, which may be finely divided or spongy platinum or any other suitable material, is incorporated in or disposed upon the surface of body portion 17 in a manner to expose large surfaces of the catalyst. One method of uniting the catalytic material with the member 16 is to embed it in the material of member 16 while that material is in a plastic condition and then baking the member to a sufficient degree of hardness and resistance to the action of liquids. The finely divided or spongy state of the active material is preferred to the massive form thereof due to the fact that it is much more active in that state. A tube 20 places the interior of container 10 in communication with the interior of the cell, the upper end of the tube being at the level at which it is desired to maintain the liquid in container 10 and thus all liquid in excess of that quantity is carried back to the cell. The purpose in maintaining a body of liquid in the container is to transfer from the member 16 the heat developed by the reaction of the combined gases, which heat is radiated from the walls of the container. In some cases, when the volume of gases handled is large, other cooling means such as a water jacket around container 10 may be required.

A transverse member 21 extends from the member 6 to the necks 14 of containers 10 and forms closures for the necks. They are retained in position on the necks by spring clips 13. In the member 21 are passages 22 to permit the gases rising from the cell through member 6 to pass to the necks 14, the outer ends of the passages 22 being disposed adjacent to the body portion 17 of member 16 whereby the gases are brought into intimate contact with the catalytic material. Owing to the fact that the gases given off from the cell carry entrained particles of the acid electrolyte and to the fact that the acid "poisons" the catalytic, i. e., reduces its effectiveness, I have provided resistance elements 23 in the body portion 17 through which current may be passed when the cell is not being charged to heat the catalyst and so rejuvenate its activity. A binding post 24 is connected to one terminal of the heating element in each body portion 17 and the other terminals of the heating elements are connected together by a strap 25.

The hydrogen and oxygen evolved by dissociation of the water in the electrolyte pass up through the member 6 and from the upper portion of that member through the passages 22 to the catalyst on body portion 17 where they recombine chemically to form water. Inasmuch as this is an exothermic reaction, the temperature of the catalyst would be increased to the point that explosions would occur if it were not for the cooling provided. As is shown in Figure 2 the water stands in container 10 almost to the body portion 17 and provides an effective medium for removing the excess heat from member 16. If it is impracticable to provide cooling means for large batteries the temperature may be kept down by reducing the charging voltage since the evolution of gas is proportional thereto and if it is low the volume of gases will be smaller.

Other suitable materials than those mentioned for the body portion 17 are asbestos fiber or board and silica.

It is to be noted that all joints are provided with gaskets that form a tight seal against the escape of air, liquid, or gas.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. In combination with a cell adapted to contain electrolyte and an apertured cover therefor, heat-radiating containers for liquid disposed on the cover, a cap on each of said containers, each of said caps having a neck, a tube extending into the cell and up into each container to a predetermined level above the base thereof, a heat- and acid-resistant member having a body portion disposed in the neck of each container and legs resting on the base of the container to support the body above said level, catalytic material suitable to cause hydrogen and oxygen to react together exposed on the surface of said body, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

2. In combination with a cell adapted to contain electrolyte and an apertured cover therefor, heat-radiating containers for liquid disposed on the cover, a cap on each of said containers, each of said caps having a neck, a tube extending into the cell and up into each container to a predetermined level above the base thereof, a heat- and acid-resistant member having a body portion disposed in the neck of each container and legs resting on the base of the container to support the body above said level, catalytic material suitable to cause hydrogen and oxygen to react together incorporated in the surface of said body portion, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

3. In combination with a cell adapted to contain electrolyte and an apertured cover therefor, heat-radiating containers for liquid disposed on the cover, a cap on each of said containers, each of said caps having a neck, a tube extending into the cell and up into each container to a predetermined level above the base thereof, a member having a body portion disposed in the neck of each container and legs resting on the base of the container to support the body above said level, catalytic material suitable to cause hydrogen and oxygen to react together exposed on the surface of said body, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

4. In combination with a cell adapted to contain electrolyte and an apertured cover therefor, containers for liquid disposed on the cover, a cap on each of said containers, each of said caps having a neck, a tube extending into the cell and up into each container to a predetermined level above the base thereof, a heat- and acid-resistant member having a body portion disposed in the neck of each container and legs resting on the base of the container to support the body above said level, catalytic material suitable to cause hydrogen and oxygen to react together exposed on the surface of said body, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

5. In combination with a cell adapted to contain electrolyte and an apertured cover therefor, containers for liquid disposed on the cover, a cap on each of said containers, each of said caps having a neck, a tube extending into the cell and up into each container to a predetermined level above the base thereof, a heat- and acid-resistant member having a body portion disposed in the neck of each container and legs resting on the base of the container to support the body above said level, heating means in said body portion, catalytic material suitable to cause hydrogen and oxygen to react together exposed on the surface of said body, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

6. In combination with a cell adapted to contain electrolyte and an apertured cover therefor, containers for liquid disposed on the cover, a cap on each of said containers, each of said caps having a neck, a tube extending into the cell and up into each container to a predetermined level, a heat- and acid-resistant member having a body portion disposed in the neck of each container and legs resting on the base of the container to support the body above said level above the base thereof, electric heating means in said body portion, catalytic material suitable to cause hydrogen and oxygen to react together exposed on the surface of said body, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

7. In combination with a cell adapted to contain electrolyte and an apertured cover therefor, containers for liquid disposed on the cover, a cap on each of said containers, each of said caps having a neck, a tube extending into the cell and up into each container to a predetermined level above the base thereof, a heat- and acid-resistant member having a body portion disposed in the neck of each container and legs resting on the base of the container to support the body above said level, catalytic material suitable to cause hydrogen and oxygen to react together exposed on the surface of said body, heating means in said member to rejuvenate the activity of said catalyst, a tubular member having one end disposed in the aperture of the cover and a member extending from said tubular member to each of said containers to form a closure for the necks of the containers, there being passages in the last-mentioned member communicating with the tubular member and the space in each neck immediately above said body portion.

8. In combination with an electric storage cell, a glass container internally and externally corrugated, a cover on said container having a neck, a member having a body portion disposed in said neck and supporting legs resting on the bottom of said container, catalytic material suitable to cause hydrogen and oxygen to react together exposed on the surface of said body portion, an electric heating wire in said body portion, external connections for said heating wire, means to conduct gases from said cell to the catalytic material, a portion of the last-mentioned means forming a closure for said neck and means to carry to the cell all water in the container in excess of a predetermined quantity.

9. An element for catalysis apparatus, comprising a body portion and legs therefor, all of compact material resistant to moisture, acid and heat, and substantially impermeable to gases finely divided catalytic material suitable to cause hydrogen and oxygen to react together and not detrimentally affected by electrolyte bonded to the exterior surface of said body, and electric resistance heating means in said body.

10. An element for catalysis apparatus, comprising a body of hardened plastic material resistant to moisture, acid and heat, and substantially impermeable to gases finely divided catalytic material suitable to cause hydrogen and oxygen to react together and not detrimentally affected by electrolyte bonded to the surface thereof, and electric resistance heating means in said body.

11. An element for catalysis apparatus, comprising a body of hardened plastic material resistant to moisture, acid and heat, and substantially impermeable to gases and finely divided catalytic material suitable to cause hydrogen and oxygen to react together and not detrimentally affected by electrolyte bonded to the surface thereof.

HARRY A. GUTHRIE.